US012597447B2

(12) United States Patent
Harrington

(10) Patent No.: US 12,597,447 B2
(45) Date of Patent: Apr. 7, 2026

(54) ONLINE COURSE DELIVERY FEEDBACK CONTENT EDITING SYSTEM

(71) Applicant: TY MAXXY PTY LTD, Preston (AU)

(72) Inventor: Martin Harrington, Preston (AU)

(73) Assignee: TY MAXXY PTY LTD, Preston (AU)

( * ) Notice: Subject to any disclaimer, the term of this patent is extended or adjusted under 35 U.S.C. 154(b) by 0 days.

(21) Appl. No.: 18/872,162

(22) PCT Filed: Jun. 20, 2023

(86) PCT No.: PCT/AU2023/050549
§ 371 (c)(1),
(2) Date: Dec. 5, 2024

(87) PCT Pub. No.: WO2023/245234
PCT Pub. Date: Dec. 28, 2023

(65) Prior Publication Data
US 2025/0329347 A1 Oct. 23, 2025

(30) Foreign Application Priority Data
Jun. 21, 2022 (AU) ................................ 2022901695

(51) Int. Cl.
*G11B 27/036* (2006.01)
*G06Q 50/20* (2012.01)
(Continued)

(52) U.S. Cl.
CPC ......... *G11B 27/036* (2013.01); *G06Q 50/205* (2013.01); *G06T 3/40* (2013.01);
(Continued)

(58) Field of Classification Search
CPC ...... G11B 27/036; G06Q 50/205; G06T 3/40; G06T 11/60; G09B 5/065; G09B 5/14
See application file for complete search history.

(56) References Cited

U.S. PATENT DOCUMENTS

2008/0241812 A1* 10/2008 Ashmore ................. G09B 5/00
434/365
2009/0319571 A1 12/2009 Johnson et al.
(Continued)

FOREIGN PATENT DOCUMENTS

CN 105844987 B 10/2019

OTHER PUBLICATIONS

International Preliminary Report on Patentability (Chapter II) dated Oct. 17, 2024 from PCT Application No. PCT/AU2023/050549, 5 pages.
(Continued)

*Primary Examiner* — Mishawn N. Hunter
(74) *Attorney, Agent, or Firm* — INNOVATION CAPITAL LAW GROUP, LLP; Vic Lin

(57) ABSTRACT

The system described in this document consists of a student terminal, an instructor terminal, and a content server connected through a wide area network. The content server contains course content multimedia. which is downloaded and displayed on the student terminal's digital display. During the course. the server can receive and store upload data from the student terminal. which may include images or videos. This upload data is then made available to the instructor terminal. The instructor terminal has a multimedia editing user interface that displays the upload data and allows the instructor to add markup data at specific XY coordinates on the screen. The student terminal can display the upload data with the added markup. The system is designed to regenerate the augmented video in native format to allows the student terminal to download and display the augmented video without requiring additional plug-ins or software.

19 Claims, 3 Drawing Sheets

(51) Int. Cl.

| | | |
|---|---|---|
| *G06T 3/40* | (2006.01) | |
| *G06T 11/60* | (2006.01) | |
| *G09B 5/06* | (2006.01) | |
| *G09B 5/14* | (2006.01) | |

(52) U.S. Cl.

CPC .............. *G06T 11/60* (2013.01); *G09B 5/065* (2013.01); *G09B 5/14* (2013.01); *G06T 2200/24* (2013.01)

(56) References Cited

U.S. PATENT DOCUMENTS

| | | | | |
|---|---|---|---|---|
| 2012/0254308 A1* | 10/2012 | Habib | ..................... | G09B 5/08 |
| | | | | 709/204 |
| 2014/0325557 A1* | 10/2014 | Evans | ................. | H04N 21/458 |
| | | | | 725/32 |
| 2016/0293032 A1* | 10/2016 | Daetwyler | ............. | G09B 5/065 |
| 2017/0154543 A1* | 6/2017 | King | ........................ | G09B 7/02 |
| 2021/0142688 A1* | 5/2021 | Kumar | ..................... | G09B 7/00 |
| 2022/0237367 A1* | 7/2022 | Tundwal | ............. | G06F 11/3466 |
| 2023/0162612 A1* | 5/2023 | Reed | ........................ | G09B 7/02 |
| | | | | 434/322 |

OTHER PUBLICATIONS

International Search Report & Written Opinion dated Jul. 31, 2023 from PCT Application No. PCT/AU2023/050549, 9 pages.

Kleftodimos et al., "Edutainment and practice in video-based learning: enriching educational videos with interactive activities and games", Int. J. Entertainment Technology and Management, vol. 1, No. 1, 2020, 30 pages.

Mackay et al., 'Practical Online Learning and Laboratories For Engineering, Science and Technology: Apply the new online technologies to create brilliant hands-on, interactive education and training for professionals and students of engineering and technology. ', IDC Technologies Pty Ltd, West Perth, Western Australia, 2014, ISBN: 978-1-922062-09-3, Chapter 4, pp. 114-150 (41 pages).

* cited by examiner

ONLINE COURSE DELIVERY FEEDBACK CONTENT EDITING SYSTEM

FIELD OF THE INVENTION

This invention relates generally to a system for multimedia editing of online course delivery feedback.

BACKGROUND

Multimedia-based education systems are increasingly being adopted for distance learning scenarios wherein teachers and students interact virtually using respective electronic devices.

For example, a lecture video may be recorded by a teacher using a device with a camera which is then uploaded to cloud storage for retrieval and display on a plurality of student electronic devices, such as mobile devices, tablets, personal computing devices and the like.

CN 105844987 B (Shenzhen Kerun Visual Technology Co Ltd) 8 Oct. 2019 discloses a system that enhances multimedia teaching by incorporating interactive features. The system enables students to actively engage with the educational content, fostering a more dynamic and effective learning environment.

The present invention seeks to provide a way to overcome or substantially ameliorate at least some of the deficiencies of the prior art, or to at least provide an alternative.

SUMMARY OF THE DISCLOSURE

There is provided herein a system comprising a student terminal authenticated with a student profile, an instructor terminal authenticated with an instructor profile and content server in operable communication across a wide area network, each comprising a processor fetching, interpreting and executing computer program code instructions from a memory device.

The content server comprises multimedia course content which is downloaded and displayed by the student terminal on a digital display thereof.

The content server is configured to receive uploaded video data from the student terminal and transmit the uploaded video data to the instructor terminal and the instructor terminal is configured to display a multimedia editing user interface displaying the uploaded video data and comprising an on-screen control for augmenting the uploaded video data with annotations at relative XY coordinates.

The system is configured for generating an augmented video file encoding both the uploaded video data and the annotations in a video format and student terminal is configured to download and display the augmented video file.

As such, the regenerated augmented video file may be downloaded and displayed by the student terminal in native format without requiring additional plug-ins or the like to display the annotations. Even standard web browsers having conventional video player format capabilities may natively display the augmented video native format thereby increasing the types of devices able to interact with the server. For example, the system may be configured to generate the augmented video file in MP4 format.

In embodiments, the system may be configured to regenerate the augmented video in the original format in which it was uploaded. In accordance with this embodiment, the system would detect the format of the video uploaded from the student terminal to detect the format thereof (such as MP4 format) so as to be able to generate the augmented video in the same format.

The system may be configured to detect the capabilities of the student terminal and to generate the augmented video file accordingly. For example, where the user interface of the student terminal is rendered by a web browser application, the system may be configured to detect the capabilities thereof. These capabilities may comprise video format capabilities, screen resolution and/or aspect ratio.

The system may be configured to generate more than one augmented video file in different formats. As such, the system may be configured to generate the augmented video file on-the-fly upon request from the student terminal or to generate the more than one augmented video file in advance of request from the student terminal for storage so that system can ascertain user terminal capabilities on-the-fly upon request from the student terminal for the augmented video file and fetch the appropriate augmented video file from the storage accordingly.

The system may be configured to generate more than one augmented video file with different screen resolutions or aspect ratios including according to those capabilities detected from client terminals registered with the server.

The system may be configured to superimpose a position of the annotations according to a user terminal screen aspect ratio or adjust sizing of the multimedia data according to user terminal screen resolution.

The upload data may comprise video data and wherein the user interface may be configured to allow the taking of snapshot image data at a timestamp position of the video data and wherein the user interface may be configured for augmenting the snapshot image data.

The on-screen control may be a drawing control configured to place drawing markings at XY relative coordinates of the upload data. The on-screen control may be a drawing control configured to place shape markings at XY relative coordinates of the upload data.

The on-screen control may be configured to initiate audio recording using a microphone of the instructor terminal and wherein the annotations may be recorded audio data.

The user interface may comprise positional controls for controlling at least one of the zoom and pan of the display of at least one of image and video data of the upload data.

The upload data may comprise image data and wherein at least one of the instructor terminal and the content server may be configured to generate augmented image data with the annotations encoded therein.

In embodiments, the server may be configured to store the annotations separate from the upload data.

The student terminal may be configured to display the upload data augmented with the annotations in real-time.

In embodiments, the student terminal may comprise a client-side plugin which augments the upload data in real-time. The student terminal only fetches the annotations from the server and augments a locally stored copy of the upload data.

The upload data may comprise video data and wherein the annotations may comprise timing data and wherein the student terminal may be configured to augment the video data with the annotations at positions according to the timing data.

The student terminal may be configured to skip to video positions according to the timing data.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
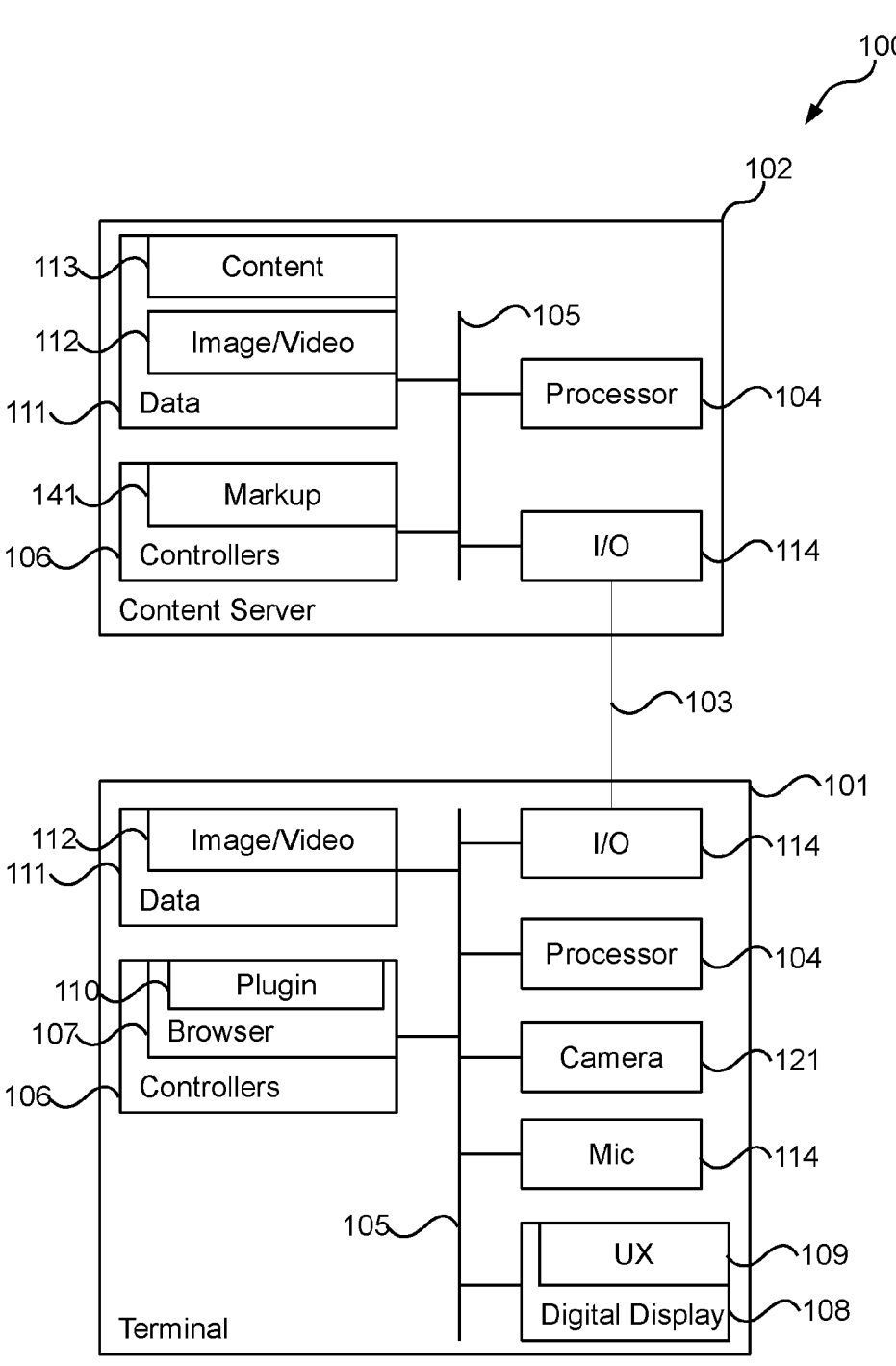
FIG. 1 shows an online course delivery feedback content editing system 100 in accordance with an embodiment.

FIG. 1 shows an online course delivery feedback content editing system 100 in accordance with an embodiment. The system 100 comprises a student terminal 101 authenticated with a student profile and an instructor terminal 101 authenticated with an instructor profile.

The system 100 further comprises a content server 102.

The terminals 101 are in operable communication with a content server 102 across a wide area network 103, such as the Internet.

The terminals 101 and the server 102 comprise a processor 104 for processing digital data. The processor 104 fetches, decodes and executes computer program code instructions from a memory device across a system bus 105 for implementing the functionality described herein.

The computer program code instructions may be logically divided into a plurality of computer program code instruction controllers 106.

In the embodiment shown, the terminals 101 may execute a browser application 107 which may control a digital display 108 to display a user interface 109. A browser 107 may comprise a plug-in 110 for real-time augmenting of image and/or video content with feedback content data as will be described in further detail below.

The memory device of the terminals may store data 111 including captured image or video data 112. The image and/or video data may be captured using a camera device 113 and/or a microphone 114.

The content server 102 may store image and video data 112 received from the terminals 101. Furthermore, the content server 102 may store course content multimedia 113. The content server 102 and the terminals 101 may comprise I/O interfaces 114 for sending and receiving data across the wide area network 103.

Figure 2:
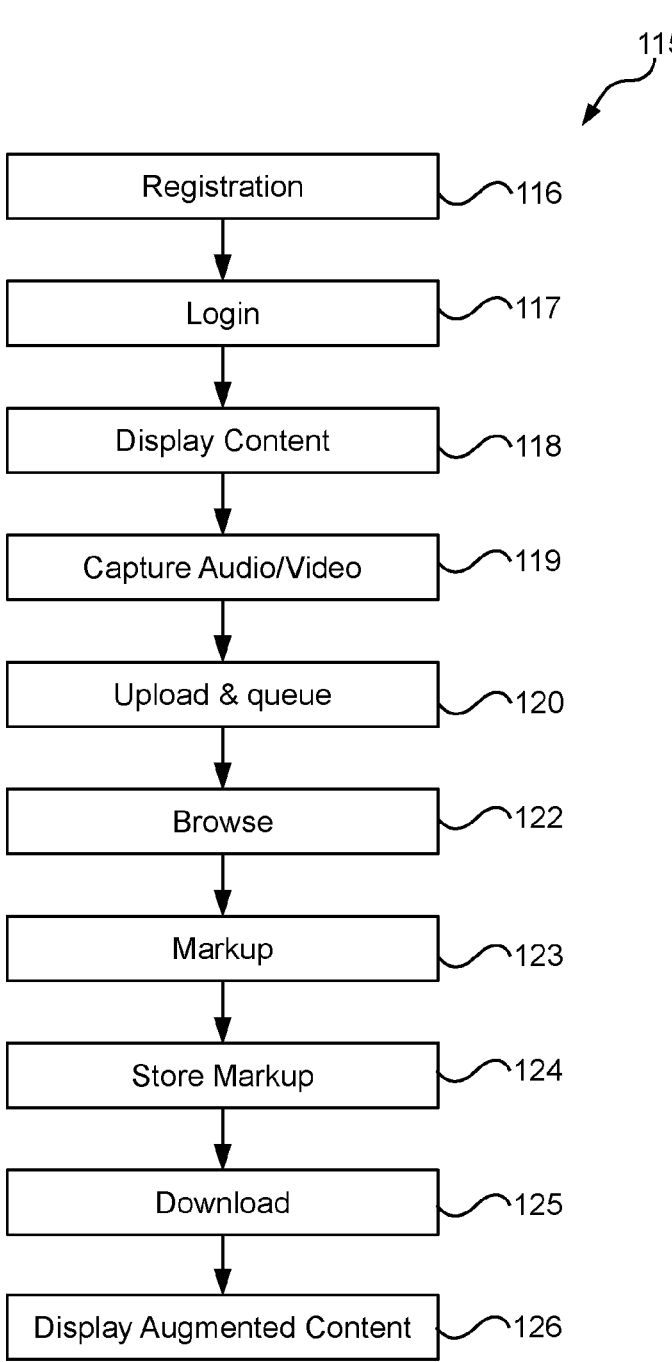
FIG. 2 shows exemplary processing by the system in accordance with an embodiment.

FIG. 2 shows exemplary processing 115 by the system 100 which will be described with reference to wherein the system is configured for delivering online course content relating to beauty therapy, although the system 100 need not be limited to this particular application.

The processing 105 comprises user registration at step 116 wherein one or more students and one or more instructors will register with the system 100 and provide relevant profile data. The content server 102 creates associated user profiles.

At step 117, the users may login so that the system comprises at least one terminal 101 authenticated with a student profile and at least one instructor terminal 101 authenticated with an instructor profile.

As alluded to above, the server 102 comprises a series of multimedia course content 113. At step 118, this multimedia course content 113 is displayed on the digital display 108 of the student terminal 101. In embodiments, the multimedia course content 113 comprises a series of webpage which are displayed in series by the web browser 107 as the student progresses through the course.

These webpages may comprise instructional text, image and/or video data.

At step 120, the content server is configured to receive and store upload data from the student terminal 101. The upload data may comprise at least one of image and/or video data.

For example, course content instructions may instruct the student to upload an image or video of the students' progress. For example, where the beauty therapy course relates to nail cosmetics, the student may be instructed to upload an image or video of the students work, which may be an image or video of nails prepared by the student. In embodiments, the course content instructions may include an exemplary image required to be uploaded.

For example, the first stage of the course content may be application of glue for the fixation of nail extensions. At this stage of the course content 113, the course content 113 may instruct the student to upload an image or video showing the students progress in the application of the nail extensions.

At step 119, the student may use the student terminal 101 to capture the image and video data using the camera 113 and/or microphone 114 of the terminal 101. Where the terminal 101 is a computer terminal, the camera 121 may take the form of an attached web camera. Alternatively, where the terminal 101 takes the form of a mobile communication device, the camera 121 may be an inbuilt image sensor thereof.

At step 122, the content server 102 may be configured to store and queue uploaded content received from a plurality of students. As such, an instructor may browse the uploaded content at step 122.

The instructor may select one of the uploaded data so that the content server 102 serves the uploaded data to the terminal 101 for display using the digital display 108 thereof.

Figure 3:
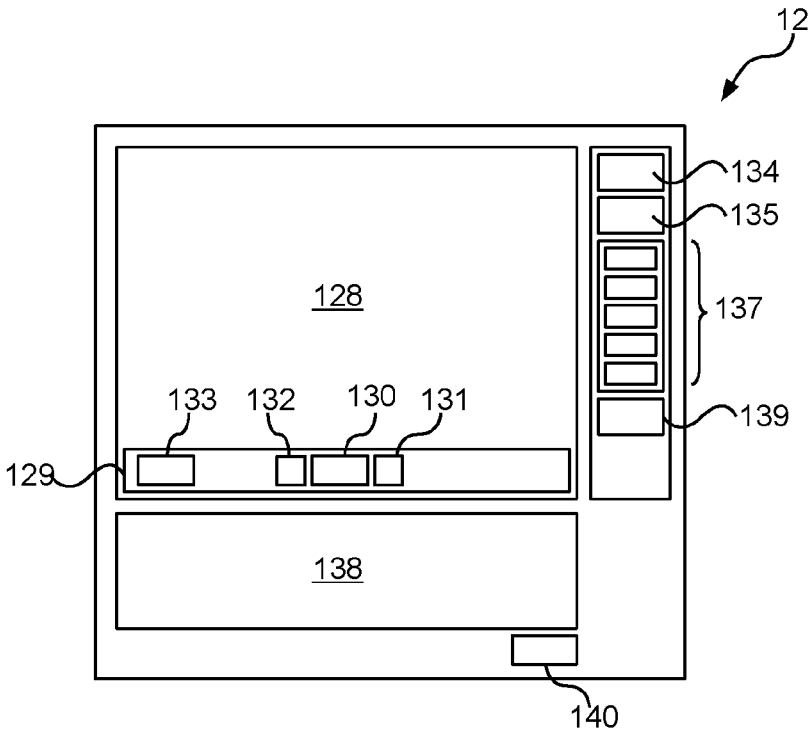
FIG. 3 shows an exemplary graphical user interface displayed by an instructor terminal of the system in accordance with an embodiment.

At step 123, the instructor terminal 101 is usable to mark up the uploaded content 123. Specifically, the instructor terminal 101 may be configured for displaying the multimedia editing user interface 127 shown in FIG. 3.

The interface 127 may comprise a display 128 of the uploaded content. Where the uploaded content comprises image data, the display 128 would display the digital image thereof. Where the uploaded content is video data, the display 128 would take the form of a video player for the display thereof. In this regard, the video player may comprise video controls 129 including pause 130, fast forward 131 and rewind controls 132.

In embodiments, the video controls 129 comprises screen capture control 133 wherein snapshot image data can be captured from a timing position of the video data. Thereafter, the snapshot image data can be marked up.

The interface 127 may comprise positional controls including a zoom control 134 and a pan control 135.

Furthermore, the interface 127 may comprise markup controls 137. The markup controls 137 may comprise drawing controls for the making of drawing markings with reference to XY coordinates of the display 128. The markup controls 137 may comprise drawing controls for placing shapes with reference to XY coordinates of the display 128. The markup controls may comprise controls for placing text with reference to XY accordance of the display. Furthermore, the markup controls may allow for the highlighting of regions of the display 128.

The interface 127 may comprise a text field input 138 wherein associated free text may be input.

The interface 127 may further comprise an audio recording control 139 wherein audio may be recorded using the microphone 114 of the structure terminal 101.

The interface 127 may comprise a save control 140 which saves the markups provided.

For example, the instructor may use the position controls 134, 135 to pan and zoom to a particular nail and then draw an arrow with reference to XY on-screen display coordinates thereof and include text to the effect that too much glue has been applied to the nail. Furthermore, the instructor use the audio control 139 to record audio explaining that too much glue has been applied.

At step 124, the content server 101 is configured to receive and store the annotations 124.

At step 125, the student terminal 101 downloads the annotations and, at step 126 displays the upload data augmented with the annotations 141.

Figure 4:
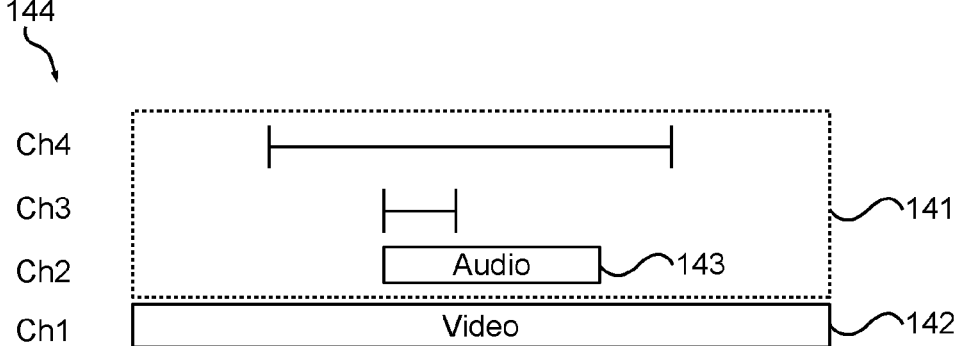
FIG. 4 shows exemplary encoding of annotations.

FIG. 4 shows an embodiment of the annotations 141 separated into a plurality of channels 144 and having timings associated with video data 142 of the upload data. In the embodiment shown, the channels 144 may comprise channel 2 comprising audio data 143 recorded by the instructor terminal 101.

The channels 144 may further comprise channel 3 relating to the display of on-screen text. The channel may comprise a start time, and an end time, and the text to be displayed, along with any effects thereof, such as font, colour and or the like.

The channels 144 may further comprise channel 4 relating to the display of on-screen shape. Similarly, the display of the on-screen shape may have a start time, an end time, and shape data describing the shape.

At least one of the instructor terminal 101 and the server 102 may be configured to regenerate augmented video in a native video format with the annotations encoded therein to increase compatibility with different types of student terminal 101 and to avoid having to use custom software or plug-ins. Such video regeneration may be done using commercially available or open source software.

For example, where the upload data comprises video data, at least one of the instructor terminal 101 and the server 102 may generate a new augmented video file in native format which has the annotations encoded as video data therein. As such, the new augmented video file may be downloaded and displayed by the student terminal 101 in native format without requiring additional plug-ins or the like to display the annotations.

As such, the user interface 109 may be rendered by a standard web browser having standardised video format capabilities without the need for specialised software to be installed on the student terminal 101.

In embodiments, the system 100 may generate the new augmented video file in MP4 format, being one of the most popular video file formats because of its universal compatibility with multimedia players including web browsers.

In embodiments, the system 100 may detect the capabilities of the student terminal 101. For example, where the user interface 109 is rendered by a web browser application, the system 100 may use web browser capability detection (such as by inspecting the HTTP user agent request header) to detect the browser capability, including the video format capabilities, screen resolution and/or aspect ratios (such as portable or landscape orientations).

As such, the system 100 may generate the new augmented video file according to the browser capabilities. For example, should browser detection detect that the student terminal 101 browser is able to play MP4 format video files, the system may be configured to generate the new augmented video file in MP4 format.

In embodiments, a plurality of user terminals 101 having differing capabilities may interface with the content server 102 wherein the system 100 generate a number of new augmented video files in different formats. For example, the system 100 may generate a first video file in MP4 format and a second video file in MOV format which are served to the respective student terminal 101 according to their capabilities.

In embodiments, the system 100 may be configured to regenerate the new augmented video files on-the-fly upon request from the student terminal 101.

However, in other embodiments, given that video file regeneration may take some time, the system 100 may generate these new augmented video files in different formats in advance of their being requested by the student terminals 101. As such, when receiving a request for a video file, the system 100 may ascertain the video capabilities thereof in substantial real-time and fetch the appropriate video file from storage 111.

In embodiments, the system 100 may be configured to regenerate the augmented video in the original format in which it was uploaded. In accordance with this embodiment, the system 100 would detect the format of the video uploaded from the student terminal 101 to detect the format thereof (such as MP4 format) so as to be able to generate the augmented video in the same format. In other words, if video in MP4 format were uploaded by the student terminal 101, the system 100 would regenerate the augmented video in the same MP4 format.

In further embodiments, the system 100 may generate video files in different screen resolutions and/or screen formats.

For example, the system 100 may generate the new augmented video files at a resolution of 1080×1920 for portrait aspect ratio mobile phone devices and 1920×1080 for landscape aspect ratio computer devices. Similarly, the system 100 may generate the new augmented video files on-the-fly according to aspect and/or resolution upon request from the terminal 101 or alternatively generate such an advance for retrieval from storage when requested.

In embodiments, the system 100 may be configured to superimpose the position of the annotations according to the capabilities of the user terminals 101 registered with the server 102. For example, for landscape aspect ratios, text may be superimposed horizontally along the lower long edge of the aspect ratio whereas for portrait aspect ratios, text may be superimposed horizontally along the lower short edge.

In embodiments, the system 100 may be configured to adjust the sizing of the multimedia data according to screen resolution. For example, for low resolution screens, such as on mobile devices, the system 100 may be configured to increase the text size so that the text remains legible on a small screen format.

In embodiments, at least one of the instructor terminal 101 and the server 102 is configured to regenerate augmented image data with the annotations encoded therein. For example, where the uploaded data comprises image data, at least one of the instructor terminal 101 of the server 102 may generate a new image file which has the annotations encoded as image data therein. As such, the new image file may be displayed natively by the browser 107 or other image viewer of the student terminal 101.

In embodiments, the server 102 is configured to store the annotations 101 separate from the upload data.

In accordance with this embodiment, the student terminal 101 may be configured to augment the separately stored annotations 101 with the upload data in substantial real-time.

For example, the browser 107 may comprise a plug-in 110 having a video display control which displays the video data. However, at timing intervals dictated by the annotations 141 shown in FIG. 4, the display of the image data is augmented with the relevant text, drawing shapes, audio and the like.

In embodiments, the student terminal 101 is configured to only download the annotations 141 from the server 102 and augment a locally stored copy of the upload data, thereby reducing bandwidth requirements and associated lag when interacting with the server 102.

In embodiments, the plugin 110 may be configured to skip to positions of the video file having feedback data.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A system comprising:
a student terminal authenticated with a student profile, an instructor terminal authenticated with an instructor profile, and a content server in operable communication across a wide area network, each comprising a processor fetching, interpreting, and executing computer program code instructions from a memory device, wherein:
the content server comprises multimedia course content which is downloaded and displayed by the student terminal on a digital display thereof;
the content server is configured to receive uploaded video data from the student terminal and transmit the uploaded video data to the instructor terminal;
the instructor terminal is configured to display a multimedia editing user interface displaying the uploaded video data and comprising an on-screen control for augmenting the uploaded video data with annotations at relative XY coordinates;
the system is configured for generating an augmented video file encoding both the uploaded video data and the annotations in a video format; and
the student terminal is configured to download and display the augmented video file.

2. The system as claimed in claim 1, wherein the user interface is configured to allow the taking of snapshot image data at a timestamp position of the video data and wherein the user interface is configured for augmenting the snapshot image data.

3. The system as claimed in claim 1, wherein the on-screen control is a drawing control configured to place drawing markings at XY relative coordinates of the uploaded data.

4. The system as claimed in claim 1, wherein the on-screen control is a drawing control configured to place shape markings at XY relative coordinates of the uploaded data.

5. The system as claimed in claim 1, wherein the on-screen control is configured to initiate audio recording using a microphone of the instructor terminal and wherein the augmented video file includes recorded audio data.

6. The system as claimed in claim 1, wherein the user interface comprises positional controls for controlling at least one of the zoom and pan of the display of at least one of image and video data of the uploaded data.

7. The system as claimed in claim 1, wherein the system is configured to generate the augmented video file in MP4 format.

8. The system as claimed in claim 1, wherein the system is configured to detect the capabilities of the student terminal and to generate the augmented video file accordingly.

9. The system as claimed in claim 8, wherein a user interface of the student terminal is rendered by a web browser application and wherein the system is configured to detect capabilities of the web browser application.

10. The system as claimed in claim 8, wherein the capabilities comprise at least one of video format capabilities, screen resolution, and aspect ratio.

11. The system as claimed in claim 1, wherein the system is configured to generate more than one augmented video file in different formats.

12. The system as claimed in claim 11, wherein the system is configured to generate the augmented video file in real-time upon request from the student terminal.

13. The system as claimed in claim 11, wherein the system is configured to generate more than one augmented video file in advance of a request from the student terminal for storage.

14. The system as claimed in claim 13, wherein the system is configured to ascertain user terminal capabilities in real-time upon request from the student terminal for the augmented video file and fetch the appropriate augmented video file from the storage accordingly.

15. The system as claimed in claim 1, wherein the system is configured to generate more than one augmented video file at different screen resolutions.

16. The system as claimed in claim 1, wherein the system is configured to generate more than one augmented video file with different aspect ratios.

17. The system as claimed in claim 1, wherein the system is configured to superimpose a position of the annotations according to a user terminal screen aspect ratio.

18. The system as claimed in claim 1, wherein the system is configured to adjust the sizing of the multimedia data according to the user terminal screen resolution.

19. The system as claimed in claim 1, wherein the system is configured to detect the format of the video data uploaded from the student terminal and generate the augmented video in the same format.

* * * * *